(12) United States Patent
Burr et al.

(10) Patent No.: US 8,721,233 B2
(45) Date of Patent: May 13, 2014

(54) DEBURRING TOOL

(75) Inventors: Mike C. Burr, Elgin, SC (US); Michael Anthony Moore, Columbia, SC (US)

(73) Assignee: Cogsdill Tool Products, Inc., Lugoff, SC (US)

( * ) Notice: Subject to any disclaimer, the term of this patent is extended or adjusted under 35 U.S.C. 154(b) by 810 days.

(21) Appl. No.: 12/870,241

(22) Filed: Aug. 27, 2010

(65) Prior Publication Data

US 2011/0052339 A1 Mar. 3, 2011

Related U.S. Application Data

(60) Provisional application No. 61/238,000, filed on Aug. 28, 2009.

(51) Int. Cl.
*B23B 51/00* (2006.01)
(52) U.S. Cl.
USPC .......................................... 408/156; 408/187
(58) Field of Classification Search
USPC ......... 408/156, 181, 187, 154, 155, 194, 193, 408/81
See application file for complete search history.

(56) References Cited

U.S. PATENT DOCUMENTS

| | | | |
|---|---|---|---|
| 1,761,804 A | 6/1930 | Snyder | |
| 2,364,293 A | 12/1944 | Hotchner | |
| 2,404,027 A * | 7/1946 | Belanger | 408/159 |
| 2,620,689 A | 12/1952 | Cogsdill | |
| 2,663,203 A * | 12/1953 | Fried et al. | 408/154 |
| 2,878,696 A * | 3/1959 | Busch | 408/28 |
| 2,895,356 A | 7/1959 | Cogsdill | |
| 3,008,360 A | 11/1961 | Winberry, Jr. | |
| 3,017,791 A | 1/1962 | Fried | |
| 3,019,712 A * | 2/1962 | Winberry, Jr. | 408/187 |

(Continued)

FOREIGN PATENT DOCUMENTS

| | | |
|---|---|---|
| AU | 561935 | 5/1987 |
| CA | 1247849 A1 | 1/1989 |

(Continued)

OTHER PUBLICATIONS

Machinery's Handbook, Edition 15 Published 1957, p. 587, Handbook.*

(Continued)

*Primary Examiner* — David Bryant
*Assistant Examiner* — Jacob Cigna
(74) *Attorney, Agent, or Firm* — Howard & Howard Attorneys PLLC

(57) ABSTRACT

A deburring tool for deburring an aperture of a work piece is disclosed. The tool includes an arbor rotatable about a central axis and having proximal and distal ends spaced from each other along the central axis. The arbor defines a slot between the proximal and distal ends. The tool includes a cutter coupled to the distal end and rotatable about a pivot axis between a cutting position, a first non-cutting position, and a second non-cutting position opposite the first non-cutting position. The tool includes a pivot disposed through the cutter and coupled to the distal end of the arbor. The tool includes a lever disposed in the slot of the arbor and movable between an engaged position engaging the pivot for applying a load to the pivot and the cutter and a disengaged position spaced from the pivot for removing the pivot and the cutter from the arbor.

21 Claims, 8 Drawing Sheets

(56) References Cited

U.S. PATENT DOCUMENTS

| | | | |
|---|---|---|---|
| 3,132,543 A | 5/1964 | Cogsdill | |
| 3,166,958 A | 1/1965 | Cogsdill | |
| 3,172,309 A | 3/1965 | Cogsdill | |
| 3,306,136 A | 2/1967 | Gustkey | |
| 3,377,890 A | 4/1968 | Cogsdill | |
| 3,411,386 A | 11/1968 | Kubicek | |
| 3,420,125 A | 1/1969 | Cogsdill | |
| 3,442,162 A | 5/1969 | Cogsdill | |
| 3,449,984 A | 6/1969 | Cogsdill | |
| 3,482,475 A | 12/1969 | Kuceris | |
| 3,540,325 A | 11/1970 | Artaud | |
| 3,658,435 A | 4/1972 | Kubicek | |
| 3,661,473 A | 5/1972 | Kubicek | |
| 3,720,477 A | 3/1973 | Rusin | |
| 3,761,104 A | 9/1973 | Kubicek | |
| 3,765,790 A | 10/1973 | Kubicek | |
| 3,787,972 A | 1/1974 | Carossino | |
| 3,806,271 A * | 4/1974 | Ishiguro et al. | 408/159 |
| 3,940,214 A | 2/1976 | Waschek | |
| 3,970,406 A | 7/1976 | Kubicek | |
| 3,973,861 A | 8/1976 | Süssmuth | |
| 3,975,111 A | 8/1976 | Kubicek | |
| 4,086,018 A | 4/1978 | Robinson et al. | |
| 4,140,432 A | 2/1979 | Heule | |
| 4,147,463 A | 4/1979 | Robinson | |
| 4,165,201 A | 8/1979 | Heule | |
| 4,303,356 A | 12/1981 | Williams | |
| 4,320,998 A | 3/1982 | Kubicek | |
| 4,333,727 A | 6/1982 | Bennett | |
| 4,343,577 A | 8/1982 | Purdon | |
| 4,580,932 A | 4/1986 | Depperman | |
| 4,660,262 A | 4/1987 | Heule | |
| 4,690,595 A | 9/1987 | Heule | |
| 4,710,072 A | 12/1987 | Heule | |
| 4,729,699 A | 3/1988 | Frazzoli | |
| 4,756,649 A | 7/1988 | Heule | |
| 4,844,670 A | 7/1989 | Heule | |
| 5,135,338 A * | 8/1992 | Heule | 408/187 |
| 5,181,810 A | 1/1993 | Heule | |
| 5,209,617 A | 5/1993 | Heule | |
| 5,277,528 A | 1/1994 | Robinson | |
| 5,288,184 A | 2/1994 | Heule | |
| 5,358,363 A | 10/1994 | Robinson | |
| 5,501,554 A | 3/1996 | Robinson et al. | |
| 5,704,743 A | 1/1998 | Goorsenberg | |
| 5,755,538 A | 5/1998 | Heule | |
| 5,764,973 A * | 6/1998 | Lunceford et al. | 1/1 |
| 5,765,973 A | 6/1998 | Hirsch et al. | |
| 5,803,679 A | 9/1998 | Heule | |
| 5,829,925 A | 11/1998 | Nordstrom | |
| 5,897,273 A | 4/1999 | Barbosa Leite | |
| 6,019,555 A | 2/2000 | Sadoski | |
| 6,033,160 A | 3/2000 | Heule et al. | |
| 6,533,505 B1 | 3/2003 | Robinson | |
| 6,551,036 B2 | 4/2003 | Heule | |
| 6,997,655 B2 | 2/2006 | Robinson | |
| 7,011,477 B2 | 3/2006 | Hecht | |
| 7,172,373 B2 | 2/2007 | Heule | |
| 7,217,070 B2 | 5/2007 | Hecht | |
| 7,261,498 B2 | 8/2007 | Hecht et al. | |
| 7,273,334 B2 | 9/2007 | Heule | |
| 7,311,480 B2 | 12/2007 | Heule et al. | |
| 7,364,389 B2 | 4/2008 | Robinson | |
| 7,445,410 B2 | 11/2008 | Abramson et al. | |
| 7,513,721 B2 | 4/2009 | Gaiser | |
| 7,524,149 B2 | 4/2009 | Heule et al. | |
| 7,740,427 B2 | 6/2010 | Heule et al. | |
| 2002/0067961 A1 | 6/2002 | Yewman | |
| 2002/0098050 A1 | 7/2002 | Heule | |
| 2004/0005200 A1 | 1/2004 | Heule et al. | |
| 2004/0101377 A1 | 5/2004 | Robinson | |
| 2005/0084346 A1 | 4/2005 | Hecht | |
| 2005/0084353 A1 | 4/2005 | Hecht | |
| 2005/0129473 A1 | 6/2005 | Heule et al. | |
| 2005/0132580 A1 | 6/2005 | Heule | |
| 2005/0163579 A1 | 7/2005 | Gaiser | |
| 2006/0127192 A1 | 6/2006 | Robinson | |
| 2006/0140732 A1 | 6/2006 | Hecht et al. | |
| 2007/0269279 A1 | 11/2007 | Abramson et al. | |
| 2008/0025804 A1 | 1/2008 | Heule et al. | |
| 2008/0166197 A1 | 7/2008 | Heule et al. | |
| 2010/0003095 A1 | 1/2010 | Heule | |
| 2010/0024220 A1 | 2/2010 | Heule et al. | |
| 2010/0166515 A1 | 7/2010 | Heule et al. | |
| 2010/0183390 A1 | 7/2010 | Heule | |
| 2010/0196111 A1 | 8/2010 | Heule | |
| 2010/0232895 A1 | 9/2010 | Heule et al. | |

FOREIGN PATENT DOCUMENTS

| | | |
|---|---|---|
| CA | 2230918 C | 6/2005 |
| CA | 2246926 C | 12/2005 |
| CN | 1081404 A | 2/1994 |
| CN | 1197417 A | 10/1998 |
| CN | 1212916 A | 4/1999 |
| CN | 1087989 C | 7/2002 |
| CN | 1105611 C | 4/2003 |
| CN | 1669706 A | 9/2005 |
| DE | 931024 | 7/1955 |
| DE | 2525872 A1 | 12/1976 |
| DE | 2839284 A1 | 3/1980 |
| DE | 236272 A1 | 6/1986 |
| DE | 3911995 A1 | 10/1990 |
| DE | 4008533 A1 | 9/1991 |
| DE | 9216677 U1 | 1/1994 |
| DE | 29519893 U1 | 1/1997 |
| DE | 19711206 A1 | 10/1997 |
| DE | 19712377 A1 | 11/1997 |
| DE | 19739621 A1 | 3/1999 |
| DE | 10218875 A1 | 11/2003 |
| DE | 10333194 A1 | 2/2005 |
| EP | 0131136 B1 | 9/1987 |
| EP | 0129116 B1 | 11/1987 |
| EP | 0231818 B1 | 8/1992 |
| EP | 0291563 B1 | 9/1992 |
| EP | 0370210 B1 | 12/1992 |
| EP | 0446767 B1 | 1/1994 |
| EP | 0488017 B1 | 5/1995 |
| EP | 0571818 B1 | 1/1997 |
| EP | 0818264 A1 | 1/1998 |
| EP | 0901861 A2 | 3/1999 |
| EP | 1075888 A1 | 2/2001 |
| EP | 0850119 B1 | 1/2002 |
| EP | 1579937 A2 | 9/2005 |
| EP | 1216775 B1 | 12/2005 |
| EP | 1621275 A2 | 2/2006 |
| EP | 1621275 A3 | 2/2006 |
| EP | 1839788 A1 | 10/2007 |
| EP | 1579937 A3 | 3/2008 |
| EP | 1579937 B1 | 7/2009 |
| EP | 1827743 B1 | 9/2009 |
| EP | 1839788 B1 | 12/2009 |
| EP | 2127791 A1 | 12/2009 |
| EP | 2161090 A2 | 3/2010 |
| EP | 2161090 A3 | 3/2010 |
| EP | 2208566 A2 | 7/2010 |
| EP | 2228160 A1 | 9/2010 |
| EP | 2208566 A3 | 2/2011 |
| EP | 2289657 A1 | 3/2011 |
| ES | 2171956 T3 | 9/2002 |
| GB | 1537120 | 12/1978 |
| HU | 63791 A2 | 10/1993 |
| HU | 216257 B | 5/1999 |
| IT | 1095790 B | 8/1985 |
| JP | 52055083 | 5/1977 |
| JP | 57008001 A | 1/1982 |
| JP | 6165706 A | 4/1986 |
| JP | 61197111 A | 9/1986 |
| JP | 2185309 A | 7/1990 |
| JP | 11138310 A | 5/1999 |
| JP | 2005271199 A | 10/2005 |
| KR | 950004666 B1 | 5/1995 |
| KR | 100187886 B1 | 6/1999 |

(56) References Cited

FOREIGN PATENT DOCUMENTS

| WO | 9515830 | A1 | 6/1995 |
|---|---|---|---|
| WO | 9801251 | A1 | 1/1998 |
| WO | 2006050841 | A1 | 5/2006 |

OTHER PUBLICATIONS

Japanese Publication No. 57008001 and English language Abstract of Japanese Publication No. 57008001 from the European Patent Office; 6 pages.
Japanese Publication No. 2185309 and English language Abstract of Japanese Publication No. 2185309 from the European Patent Office; 5 pages.
European Publication No. 1075888 and English language translation and English language Abstract of European Publication No. 1075888 from the European Patent Office; 21 pages.
European Publication No. 1621275 and English language translation and English language Abstract of European Publication No. 1621275 from the European Patent Office; 17 pages.
German Publication No. 2525872 and English language translation of German Publication No. 2525872 from the European Patent Office; 31 pages.
German Publication No. 2839284 and English language translation of German Publication No. 2839284 from the European Patent Office; 20 pages.
German Publication No. 3911995 and English language Abstract of German Publication No. 3911995 from the European Patent Office; 7 pages.
German Publication No. 19712377 and English language Abstract of German Publication No. 19712377 from the European Patent Office; 9 pages.
German Publication No. 9216677 and English language translation of German Publication No. 9216677 from the European Patent Office; 18 pages.
Japanese Publication No. 61-65706 and English language Abstract of Japanese Publication No. 61-65706 from the European Patent Office; 5 pages.
Web page article entitled "CÖFA The Universal Deburring Tool" from the Heule Tool Corporation website of http://www.heuletool.com/; dated May 11, 2006; 2 pages.
Web page article entitled "Chamfering—Deburring—Spotfacing Front and Back in One Simple Operation" from the Heule Tool Corporation website of http://www.heuletool.com/; dated Feb. 3, 2006; 2 pages.
Web page article entitled "COFA—Universal Deburring Tool for Eliptical Holes and Irregular Parts" from the Heule Tool Corporation website of http://www.heuletool.com/tools_cf.htm; dated May 11, 2006; 2 pages.
Web page article entitled "Heule Tool—Customer Applications" from the Heule Tool Corporation website of http://www.heuletool.com/appls.htm; dated Feb. 20, 2006; 5 pages.
English language European Search Report for European Application No. 10174401; mailed Nov. 24, 2010; 4 pages.

* cited by examiner

DEBURRING TOOL

CROSS REFERENCE TO RELATED APPLICATION

This application claims the benefit of U.S. Provisional Patent Application Ser. No. 61/238,000, filed on Aug. 28, 2009, the disclosure of which is hereby incorporated by reference.

BACKGROUND OF THE INVENTION

1. Field of the Invention

The subject invention generally relates to a deburring tool for deburring an aperture of a work piece.

2. Description of the Related Art

Deburring tools for deburring apertures of work pieces are known in the art. One type of deburring tool includes an arbor rotatable about a longitudinal axis with a cutter attached to the arbor. A pin is disposed through the cutter and attached to the arbor for supporting the cutter during deburring of the apertures. Typically, the pin is press fit to the arbor for maintaining attachment of the pin to the arbor. As such, when the cutter becomes dull or damaged, the cutter has to be replaced and removable of the press fit pin is difficult. Further, the press fit pin typically becomes damaged during removable and therefore the pin usually is replaced as well. In addition, special tools are generally required to remove the press fit pin. Additionally, these types of deburring tools can be difficult to adjust the load applied to the cutter.

Therefore, there remains an opportunity to develop a deburring tool that provides easy adjustment of the load applied to the cutter as well as easy replacement of the cutter.

SUMMARY OF THE INVENTION AND ADVANTAGES

The subject invention provides for a deburring tool for deburring an aperture of a work piece. The deburring tool includes an arbor rotatable about a central axis. The arbor includes a proximal end and a distal end spaced from each other along the central axis. The arbor defines a slot between the proximal and distal ends. The deburring tool also includes a cutter coupled to the distal end. The cutter is rotatable about a pivot axis transverse to the central axis between a cutting position, a first non-cutting position, and a second non-cutting position opposite the first non-cutting position. The deburring tool further includes a pivot disposed through the cutter along the pivot axis and coupled to the distal end of the arbor. The pivot supports the cutter during movement between the cutting position and the first and second non-cutting positions. The deburring tool also includes a lever disposed in the slot of the arbor. The lever is movable between an engaged position engaging the pivot for applying a load to the pivot and the cutter and a disengaged position spaced from the pivot for removing the pivot and the cutter from the arbor.

Therefore, the deburring tool provides a quick and easy way to adjust the load applied to the pivot and the cutter as well as replacement of the cutter, thus providing time and cost savings. The load applied to the pivot and the cutter can easily be adjusted by simply adjusting the lever in the engaged position. Further, the cutter can easily be replaced by simply moving the lever to the disengaged position such that the lever is spaced from the pivot thus allowing the pivot to be removed from the arbor. As such, the pivot is not damaged when being removed from the cutter and the arbor and therefore the same pivot can be utilized to support the new cutter, thus providing cost savings. In addition, special tools are not required to remove the cutter, thus providing additional cost savings.

BRIEF DESCRIPTION OF THE DRAWINGS

Advantages of the present invention will be readily appreciated, as the same becomes better understood by reference to the following detailed description, when considered in connection with the accompanying drawings.

DETAILED DESCRIPTION OF THE INVENTION

Figure 1:
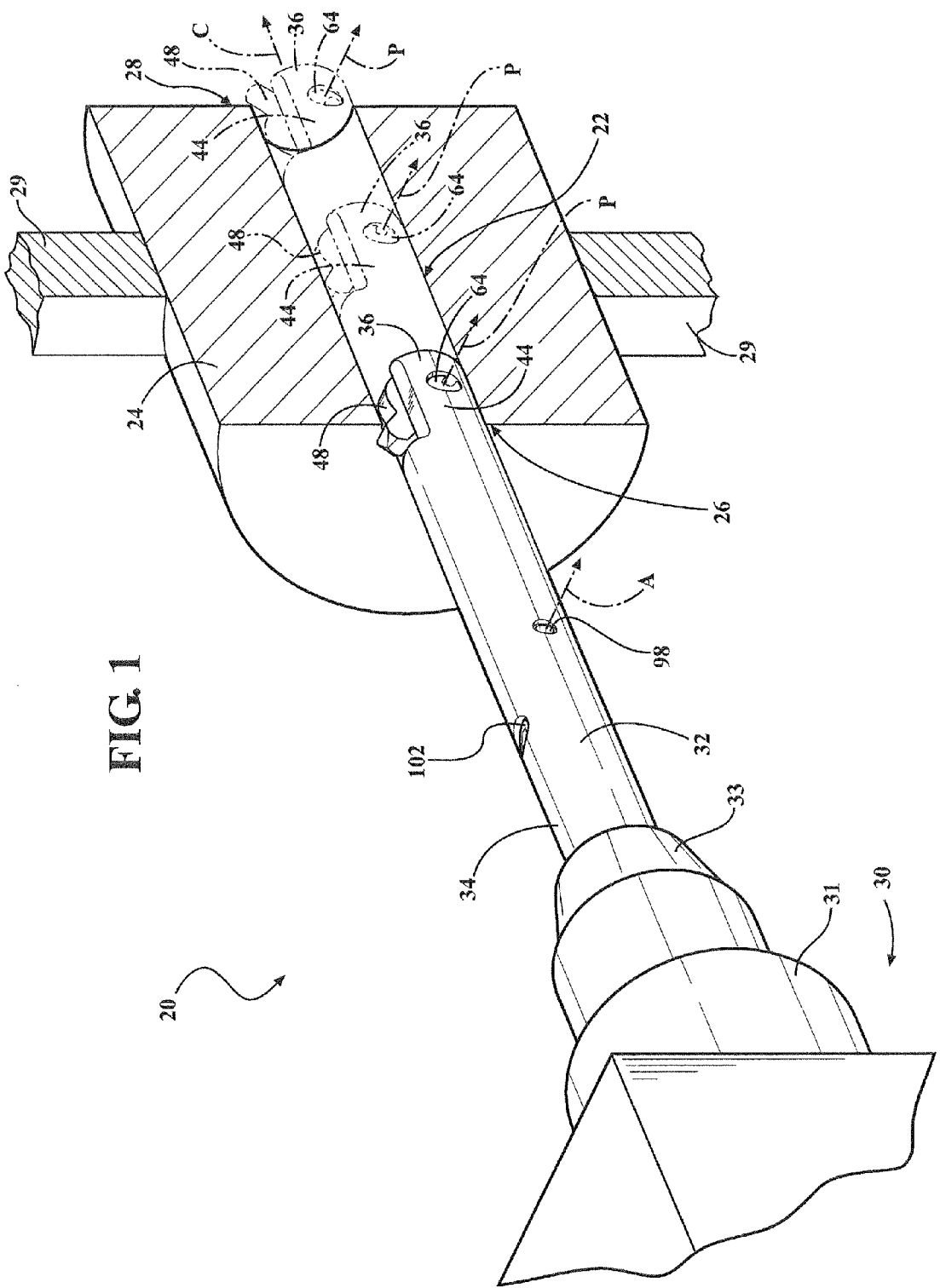
FIG. 1 is a perspective view of a deburring tool deburring an aperture of a work piece with a cutter shown in solid lines in a cutting position deburring a first end surface of the aperture, the cutter shown in phantom lines in a first non-cutting position in the aperture, and the cutter shown in phantom lines in the cutting position deburring a second end surface of the aperture.

Referring to the Figures, wherein like numerals indicate like or corresponding parts throughout the several views, a deburring tool 20 for deburring an aperture 22 of a work piece 24 is generally shown in FIGS. 1-4, 13, 14A and 14B. As shown in FIG. 1, the work piece 24 includes a first end surface 26 and a second end surface 28 spaced from each other with the deburring tool 20 deburring the first end surface 26 of the aperture 22 as shown in solid lines and the deburring tool 20 deburring the second end surface 28 of the aperture 22 as shown in phantom lines. A holder 29 is utilized to maintain a position of the work piece 24 when the deburring tool 20 is deburring the aperture 22.

The deburring tool 20 is coupled to a machine 30 as known to those skilled in the art for deburring apertures 22. The machine 30 can be further defined as power tools, drill motors, drill presses, automatic equipment, CNC machines or any other suitable machine for deburring apertures 22. For example, the machine 30 can include a spindle 31 for moving the deburring tool 20, a chuck 33 for supporting the deburring tool 20 and/or any other suitable components as known to those skilled in the art for supporting, moving, and/or coupling to the deburring tool 20. It is to be appreciated that the deburring tool 20 can be moved manually or automatically to debur the aperture 22 of the work piece 24.

Figure 2:
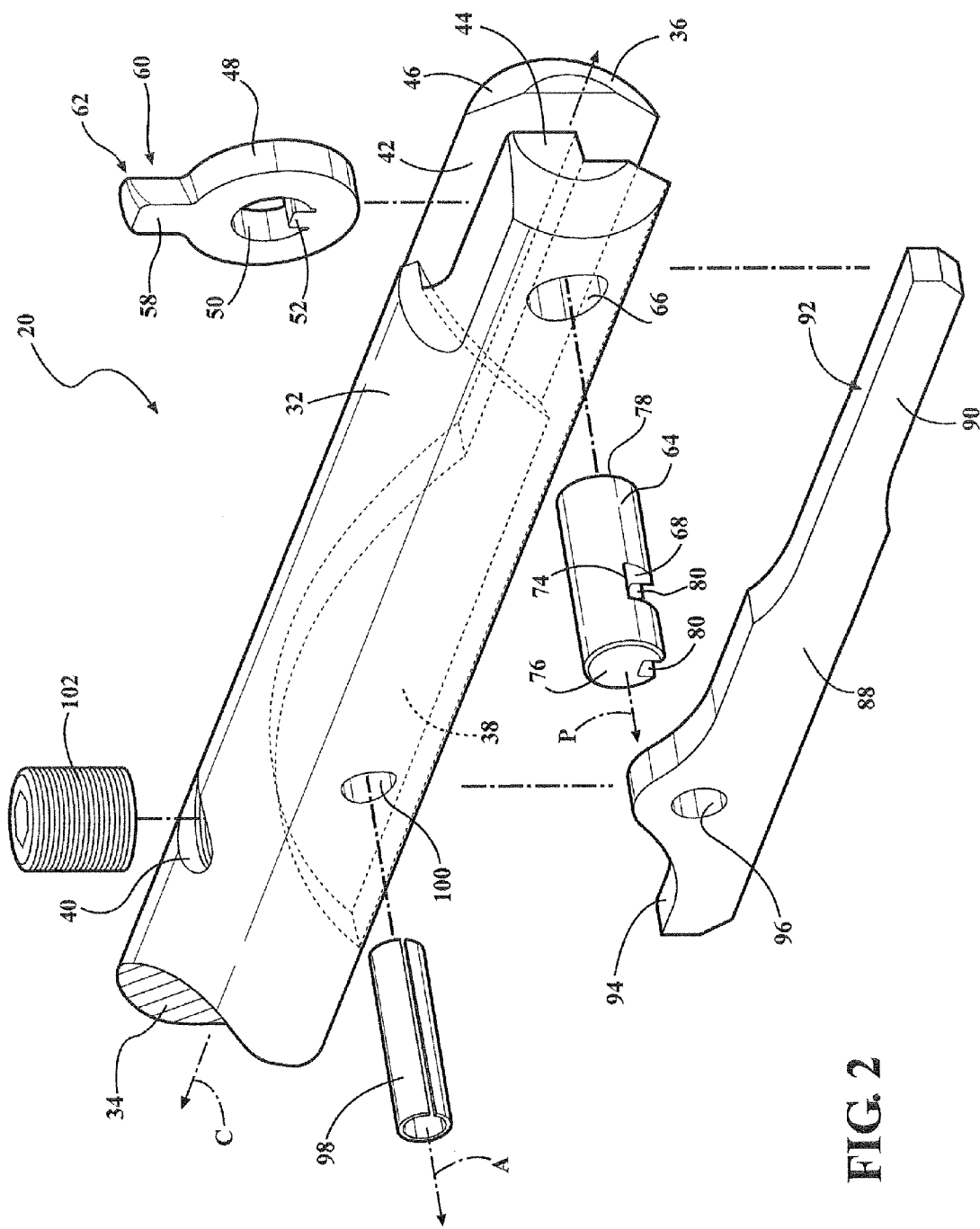
FIG. 2 is a broken-exploded perspective view of the deburring tool.

Also referring to FIG. 2, the deburring tool 20 includes an arbor 32 rotatable about a central axis C. The arbor 32 includes a proximal end 34 and a distal end 36 spaced from each other along the central axis C. The proximal end 34 of the arbor 32 is coupled to the machine 30 such that the machine 30 rotates the arbor 32 about the central axis C. In certain embodiments, the proximal end 34 is coupled to the spindle 31 of the machine 30 such that the spindle 31 rotates the arbor 32 about the central axis C and/or moves the deburring tool 20 back and forth along the central axis C, i.e., axially. The proximal end 34 is coupled to the machine 30 by any suitable method known to those skilled in the art. It is to be appreciated that the arbor 32 continuously rotates about the central axis C as the arbor 32 moves through the aperture 22 of the work piece 24. In other words, all of the components that are coupled, attached, etc. to the arbor 32 as discussed herein also rotate about the central axis C. The arbor 32 is typically formed of a metal material. More typically, the metal material is further defined as steel, such as, for example, hardened steel. It is to be appreciated that the arbor 32 can be formed of any suitable material.

The arbor 32 defines a slot 38 between the proximal and distal ends 34, 36 and extends axially relative to the central axis C. In addition, the arbor 32 defines a bore 40 transverse to the central axis C such that the bore 40 intersects the slot 38. The distal end 36 of the arbor 32 defines a slit 42 extending toward the proximal end 34 axially relative to the central axis C to define a first leg 44 and a second leg 46 spaced from each other transverse to the central axis C. Typically, the slot 38 and the slit 42 of the arbor 32 are adjacent each other.

Figure 3:
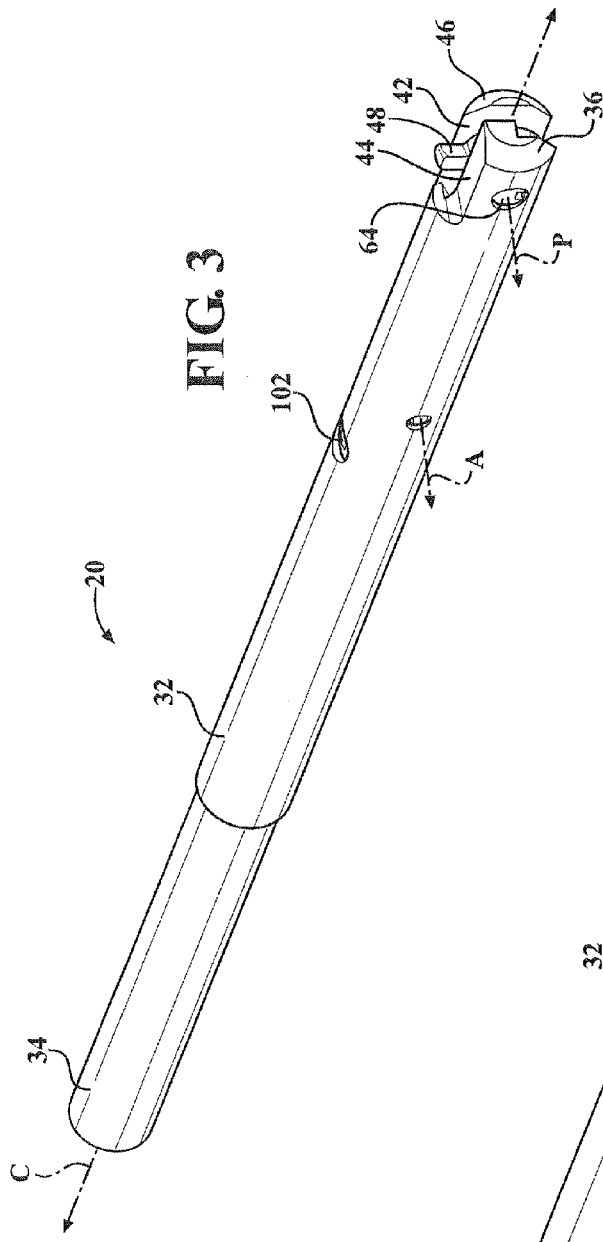
FIG. 3 is a perspective view of the deburring tool with an arbor defining a first outer diameter and a second outer diameter different from the first outer diameter.
Figure 4:
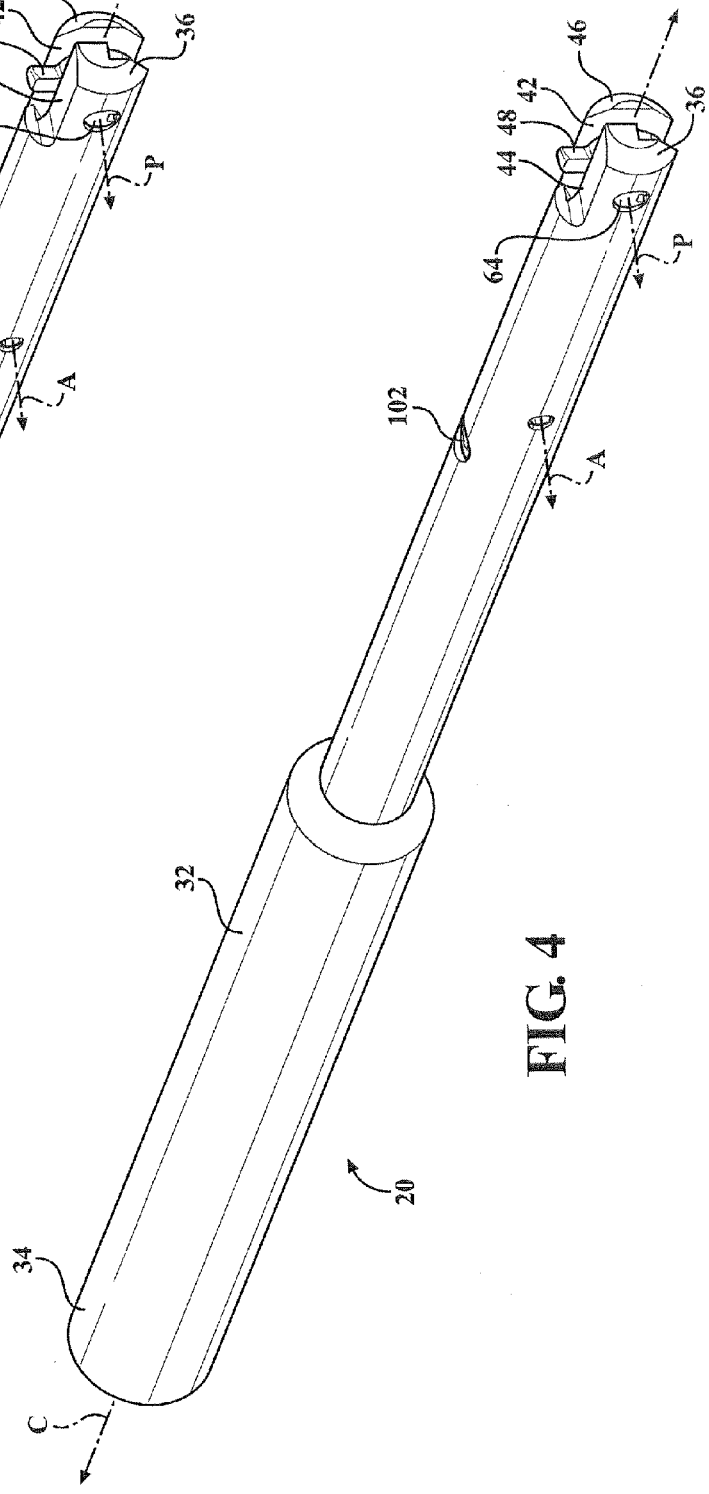
FIG. 4 is a perspective view of the deburring tool with the arbor defining the first outer diameter and the second outer diameter of another configuration.

As best shown in FIG. 1, the arbor 32 defines an outer diameter for a length of the arbor 32. Alternatively, the arbor 32 can define a first outer diameter and a second outer diameter different from the first outer diameter as shown in FIGS. 3 and 4. It is to be appreciated that the arbor 32 can be any suitable outer diameter(s) for deburring apertures 22. It is to also be appreciated that the deburring tool 20 can debur apertures 22 of any suitable configuration.

Figure 7A:
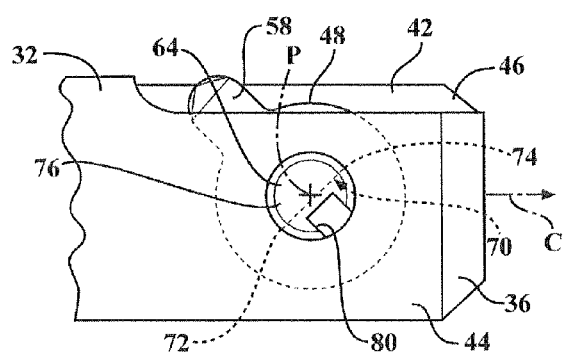
FIG. 7A is a broken plan view of the cutter disposed between a first leg and a second leg with the cutter in the first non-cutting position.
Figure 7B:
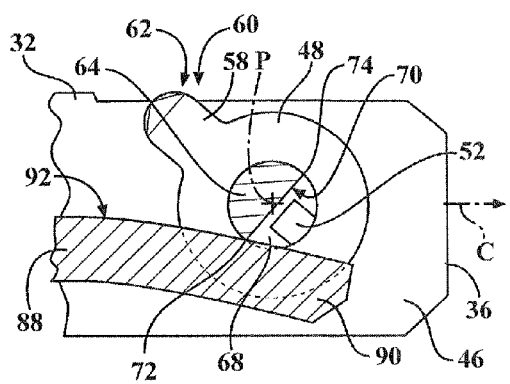
FIG. 7B is a broken cross-sectional view of the second leg with the cutter in the first non-cutting position with a first edge of a first groove of a pivot engaging a top surface of an arm of a lever such that the arm is biased downwardly.
Figure 8A:
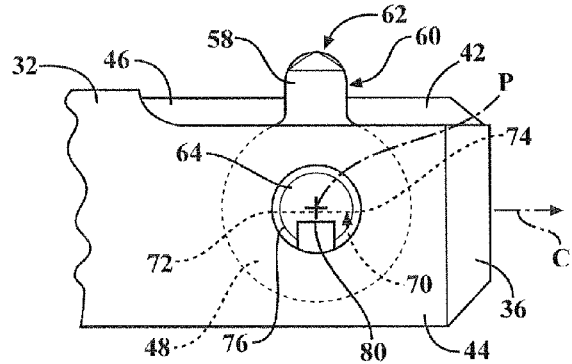
FIG. 8A is a broken plan view of the cutter disposed between the first and second legs with the cutter in the cutting position.
Figure 8B:
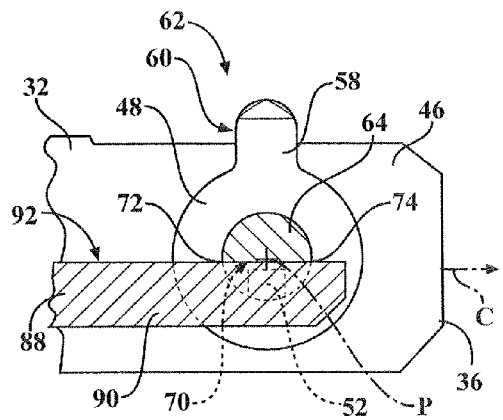
FIG. 8B is a broken cross-sectional view of the second leg with the cutter in the cutting position with a base surface of the first groove of the pivot engaging the top surface of the arm of the lever.
Figure 9A:
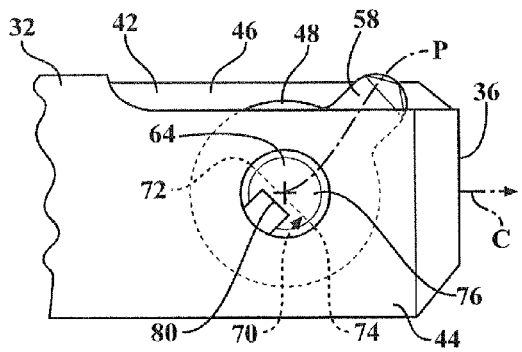
FIG. 9A is a broken plan view of the cutter disposed between the first and second legs with the cutter in a second non-cutting position.
Figure 9B:
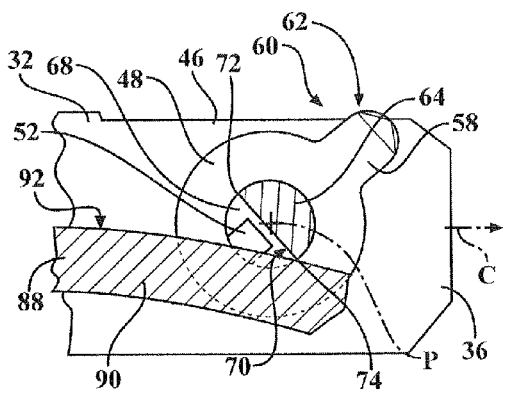
FIG. 9B is a broken cross-sectional view of the second leg and the cutter in the second non-cutting position with a second edge of the first groove of the pivot engaging the top surface of the arm of the lever such that the arm is biased downwardly.

Referring back to FIG. 1, the deburring tool 20 also includes a cutter 48 coupled to the distal end 36. Typically, the cutter 48 is disposed between the first and second legs 44, 46. The cutter 48 rotates with the arbor 32 about the central axis C as the arbor 32 moves through the aperture 22 of the work piece 24. In addition, the cutter 48 is rotatable about a pivot axis P transverse to the central axis C between a cutting position, a first non-cutting position, and a second non-cutting position opposite the first non-cutting position. The cutter 48 is rotatable about the pivot axis P to selectively retract the cutter 48 while passing through the aperture 22 of the work piece 24 which is discussed further below. The cutting position is shown in FIGS. 1, 3, 4, 8A, 8B, 13, 14A, and 14B, the first non-cutting position is shown in FIGS. 1, 7A, and 7B, and the second non-cutting position is shown in FIGS. 9A and 9B. Typically, the cutter 48 rotates counter-clockwise to the first non-cutting position and the cutter 48 rotates clockwise to the second non-cutting position. It is to be appreciated that the cutter 48 can rotate clockwise to the first non-cutting position and the cutter 48 can rotate counter-clockwise to the second non-cutting position. The cutting position includes any position that the cutter 48 is deburring the aperture 22 of the work piece 24. For example, as shown in FIG. 1, the cutting position can include both clockwise and counter-clockwise rotation. The first and second non-cutting positions include any position that the cutter 48 is not deburring the aperture 22 of the work piece 24.

Figure 5:
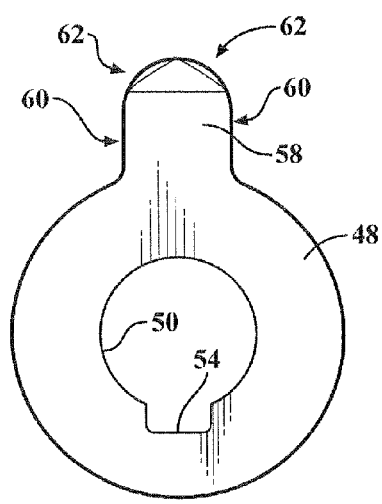
FIG. 5 a plan view of the cutter defining a passage and a cutout of an alternative configuration.
Figure 6:
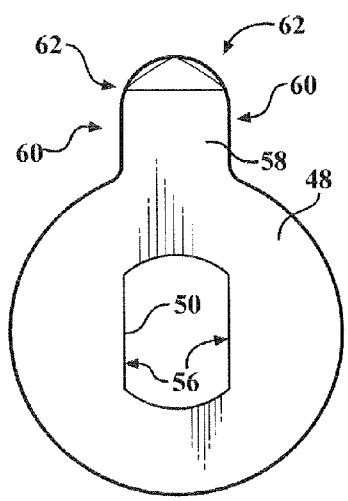
FIG. 6 a plan view of the cutter defining the passage presenting at least one flat surface of another alternative configuration.

As best shown in FIG. 2, in certain embodiments, the cutter 48 defines a passage 50 along the pivot axis P and includes a protrusion 52 extending from the passage 50 toward the pivot axis P. Alternatively, as shown in FIGS. 5 and 6, the passage 50 of the cutter 48 can be of different configurations. For example, as shown in FIG. 5, the cutter 48 can define a cutout 54 extending from the passage 50 away from the pivot axis P. As another example, as shown in FIG. 6, the passage 50 can present at least one flat surface 56 and typically the flat surface 56 is further defined as a plurality of flat surfaces 56. It is to be appreciated that the passage 50 can be any suitable configuration. Each of these cutter 48 alternatives will be discussed further below.

The cutter 48 includes an extension 58 having a cutting portion 60 for deburring apertures 22 and a non-cutting portion 62 adjacent the cutting portion 60 for preventing cutting or marking the apertures 22 as the cutter 48 passes through the apertures 22 of the work pieces 24. Typically, the extension 58 extends outwardly away from the pivot axis P. As best shown in FIGS. 1, 8A, and 8B, the cutting portion 60 extends outwardly from the slit 42 when the cutter 48 is in the cutting position and as best shown in FIGS. 1, 7A, 7B, 9A, and 9B, the cutting portion 60 is retracted in the slit 42 when the cutter 48 is in the first and second non-cutting positions. When the cutter 48 rotates about the pivot axis P while moving through the apertures 22, the cutting portion 60 is retracted in the slit 42 and only the non-cutting portion 62 is exposed to the work piece 24 thus preventing undesirable cutting or marking of the aperture 22 of the work piece 24. The cutting position includes any position that the cutting portion 60 of the cutter 48 is engaging the aperture 22 of the work piece 24. The first and second non-cutting positions include any position that the non-cutting portion 62 of the cutter 48 is engaging the aperture 22 of the work piece 24.

The cutting portion 60 can be configured to any suitable geometry for deburring the aperture 22 of the work piece 24. Likewise, the non-cutting portion 62 can be configured to any suitable geometry for preventing undesirable cutting or marking of the aperture 22 of the work piece 24. It is to be appreciated that the non-cutting portion 62 can be defined as a polished crown as known to those skilled in the art. The cutter 38 can be formed of carbide or any other suitable material.

Figure 10:
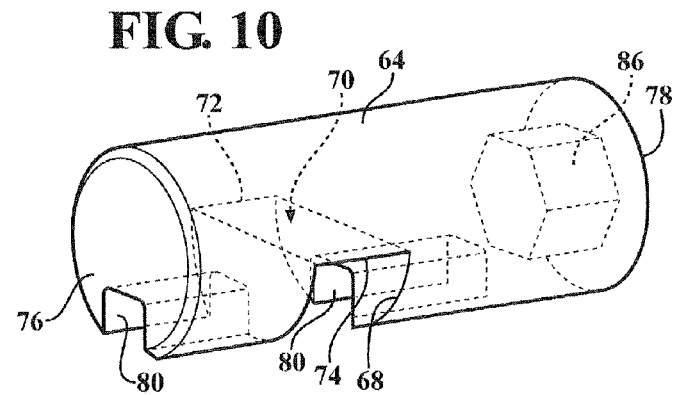
FIG. 10 is a perspective view of the pivot defining a first groove and a second groove.

Referring to FIGS. 2 and 10, the deburring tool 20 further includes a pivot 64 disposed through the cutter 48 along the pivot axis P. More specifically, as discussed in detail below, the pivot 64 and the cutter 48 are rotatable together about the pivot axis P (see FIGS. 7A-9B). In other words, the pivot 64 concurrently rotates with the cutter 48 between the cutting position and the first and second non-cutting positions. In addition, the pivot 64 is coupled to the distal end 36 of the arbor 32 with the pivot 64 supporting the cutter 48 during movement between the cutting position and the first and second non-cutting positions. Typically, the pivot 64 is coupled to at least one of the first and second legs 44, 46 and supports the cutter 48. More typically, the pivot 64 is coupled to both the first and second legs 44, 46 and supports the cutter 48. The first and second legs 44, 46 each define a first orifice 66 along the pivot axis P with the pivot 64 disposed in the first orifice 66 of each of the first and second legs 44, 46 for coupling the cutter 48 to the arbor 32. As such, the pivot 64 also rotates about the central axis C during rotation of the arbor 32.

As best shown in FIG. 10, the pivot 64 defines a first groove 68 transverse to the pivot axis P with the first groove 68 of the pivot 64 presenting a base surface 70. The base surface 70 defines a flat configuration. The first groove 68 of the pivot 64 presents a first edge 72 and a second edge 74 spaced from each other transverse to the pivot axis P such that the base surface 70 is disposed between the first and second edges 72, 74.

The pivot 64 includes a first end 76 and a second end 78 spaced from each other along the pivot axis P with the first groove 68 disposed between the first and second ends 76, 78. In certain embodiments, the pivot 64 also defines a second groove 80 axially relative to the pivot axis P. Typically, the first groove 68 intersects the second groove 80 such that the second groove 80 is split into two parts. The second groove 80 extends from one of the first and second ends 76, 78 toward an other one of the first and second ends 76, 78. Typically, the second groove 80 extends from the first end 76 toward the second end 78 and is spaced from the second end 78. It is to be appreciated that the second groove 80 can extend from both the first and second ends 76, 78.

The pivot 64 is disposed through the passage 50 of the cutter 48 and the protrusion 52 of the cutter 48 is disposed in the second groove 80 such that the pivot 64 concurrently rotates with the cutter 48 between the cutting position and the first and second non-cutting positions. In other words, the pivot 64 and the cutter 48 are coupled together such that the pivot 64 concurrently rotates with the cutter 48 between the cutting position and the first and second non-cutting positions. Said differently, the protrusion 52 of the cutter 48 and the second groove 80 of the pivot 64 are complementary in configuration to each other such that the cutter 48 and the pivot 64 are prevented from rotating independently of each other about the pivot axis P.

Figure 11:
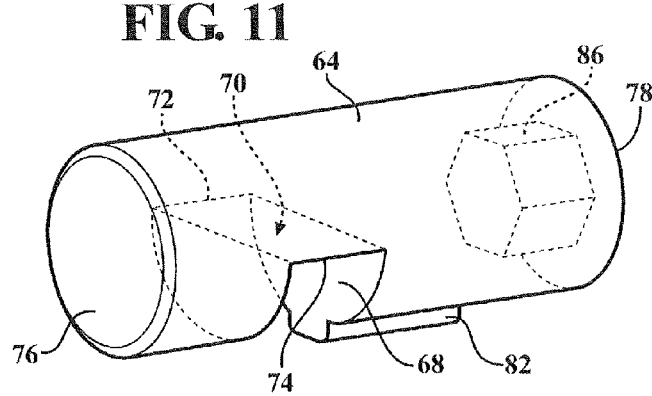
FIG. 11 is a perspective view of the pivot defining the first groove and including a protrusion of an alternative configuration.
Figure 12:
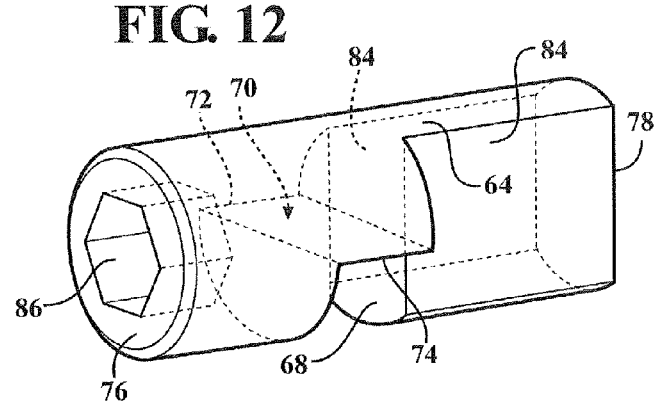
FIG. 12 is a perspective view of the pivot defining the first groove and at least one notch of another alternative configuration.

Alternatively, as shown in FIGS. 11 and 12, the pivot 64 can be of different configurations. For example, as shown in FIG. 11, the pivot 64 defines the first groove 68 between the first and second ends 76, 78 and includes a projection 82 extending outwardly away from the pivot axis P and spaced from the first groove 68 such that the projection 82 is disposed between the first groove 68 and the second end 78. The projection 82 of the pivot 64 receives the cutout 54 of the cutter 48 such that the pivot 64 concurrently rotates with the cutter 48 between the cutting position and the first and second non-cutting positions. It is to be appreciated that the first orifice 66 of at least one of the first and second legs 44, 46 can be configured for receiving the projection 82. As another example, as shown in FIG. 12, the pivot 64 defines the first groove 68 between the first and second ends 76, 78 and defines at least one notch 84 spaced from the first groove 68 such that the notch 84 is disposed between the first groove 68 and the second end 78. The flat surface corresponds to the notch 84 such that the pivot 64 concurrently rotates with the cutter 48 between the cutting position and the first and second non-cutting positions. Typically, the notch 84 is further defined as a plurality of notches 84 each having a flat configuration corresponding to the flat surface 56 of the cutter 48 such that the pivot 64 concurrently rotates with the cutter 48 between the cutting position and the first and second non-cutting positions. It is to be appreciated that any suitable configuration of the pivot 64 and the passage 50 of the cutter 48 can be utilized such that the pivot 64 concurrently rotates with the cutter 48 between the cutting position and the first and second non-cutting positions. In addition, it is to be appreciated that any suitable configuration of the first orifice 66 of the first and second legs 44, 46 can be utilized for receiving the pivot 64.

Optionally, as shown in FIGS. 10 and 11, the pivot 64 defines a recess 86 extending from the second end 78 toward the first end 76. In the alternative shown in FIG. 10, the recess 86 is spaced from the second groove 80. More specifically, the recess 86 is spaced from the first and second grooves 68, 80. Alternatively, as shown in FIG. 12, the recess 86 can extend from the first end 76 instead of the second end 78.

As another option, a support (not shown) is selectively disposed in the recess 86 for aiding in removing and/or replacing the cutter 48. In other words, the support can be utilized to support the pivot 64 when removing the pivot 64 from the arbor 32 to remove and/or replace the cutter 48 with a new cutter (not shown). The support can also be utilized to support the pivot 64 when re-coupling the pivot 64 to the arbor 32 after replacing the cutter 48. The support can be further defined as a wrench, such as an Allen wrench, or any other suitable support for aiding in removing and/or replacing the cutter 48.

Figure 13:
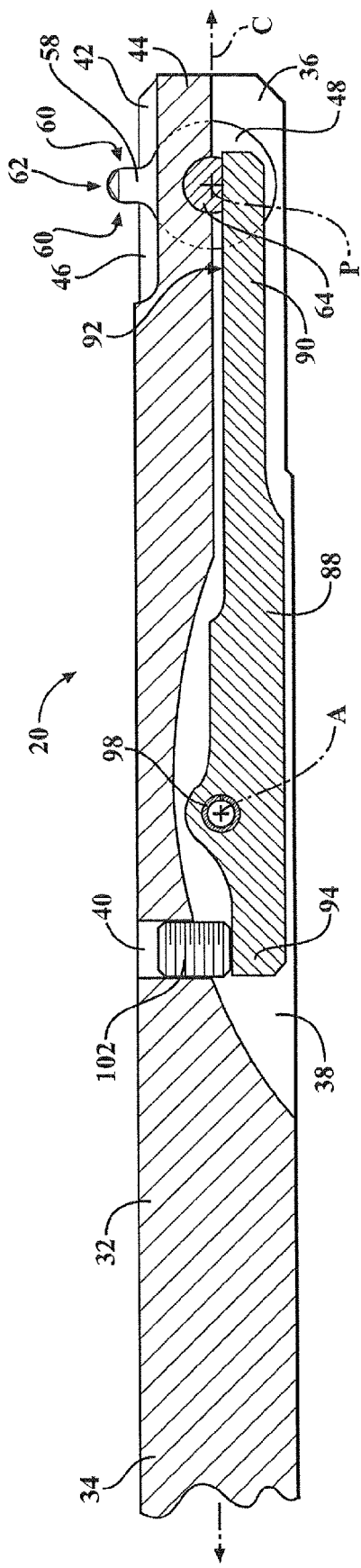
FIG. 13 is a partial cross-sectional view of the deburring tool.
Figure 14A:
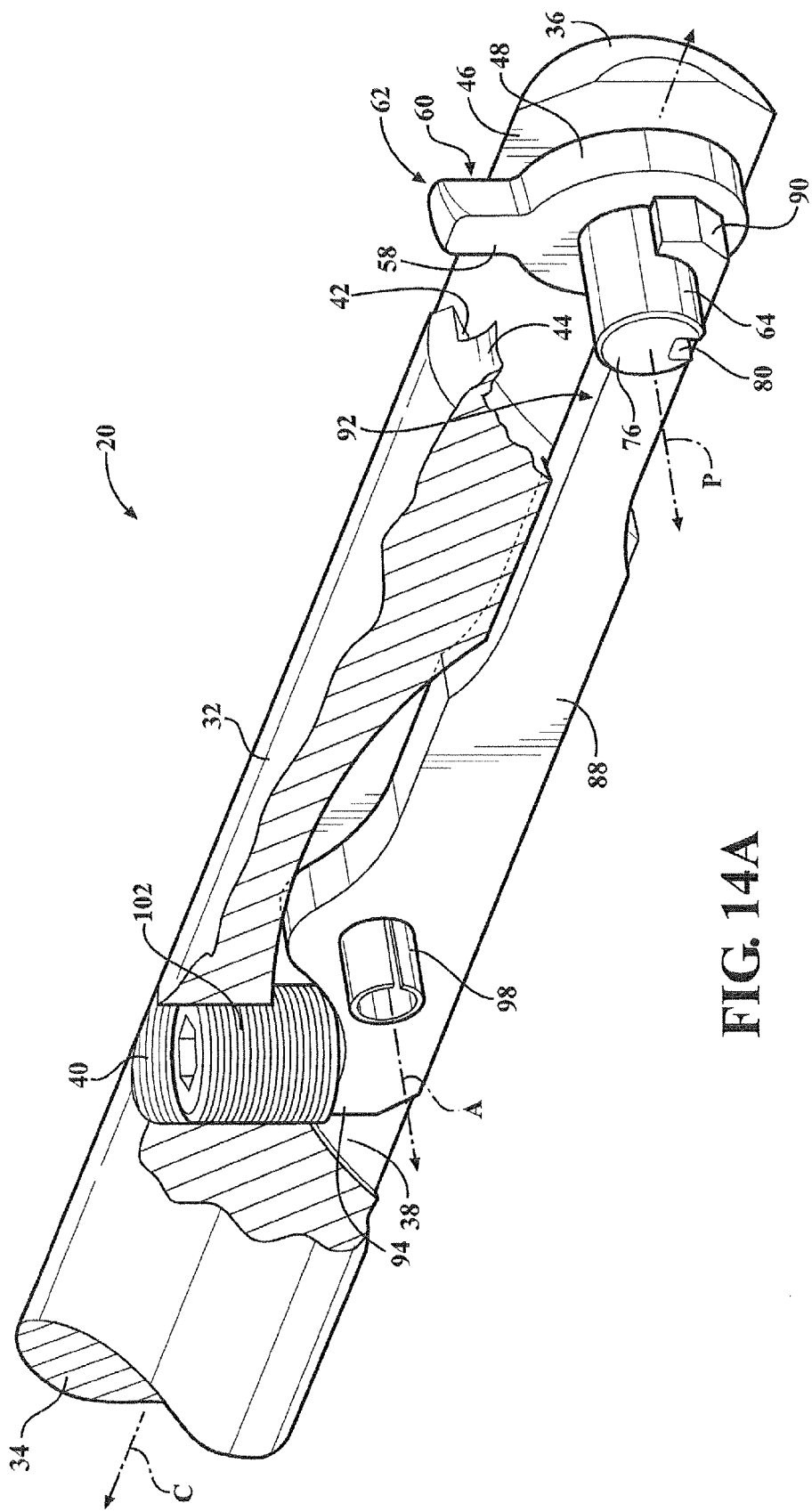
FIG. 14A is a broken cross-sectional perspective view of the deburring tool with the lever in an engaged position.
Figure 14B:
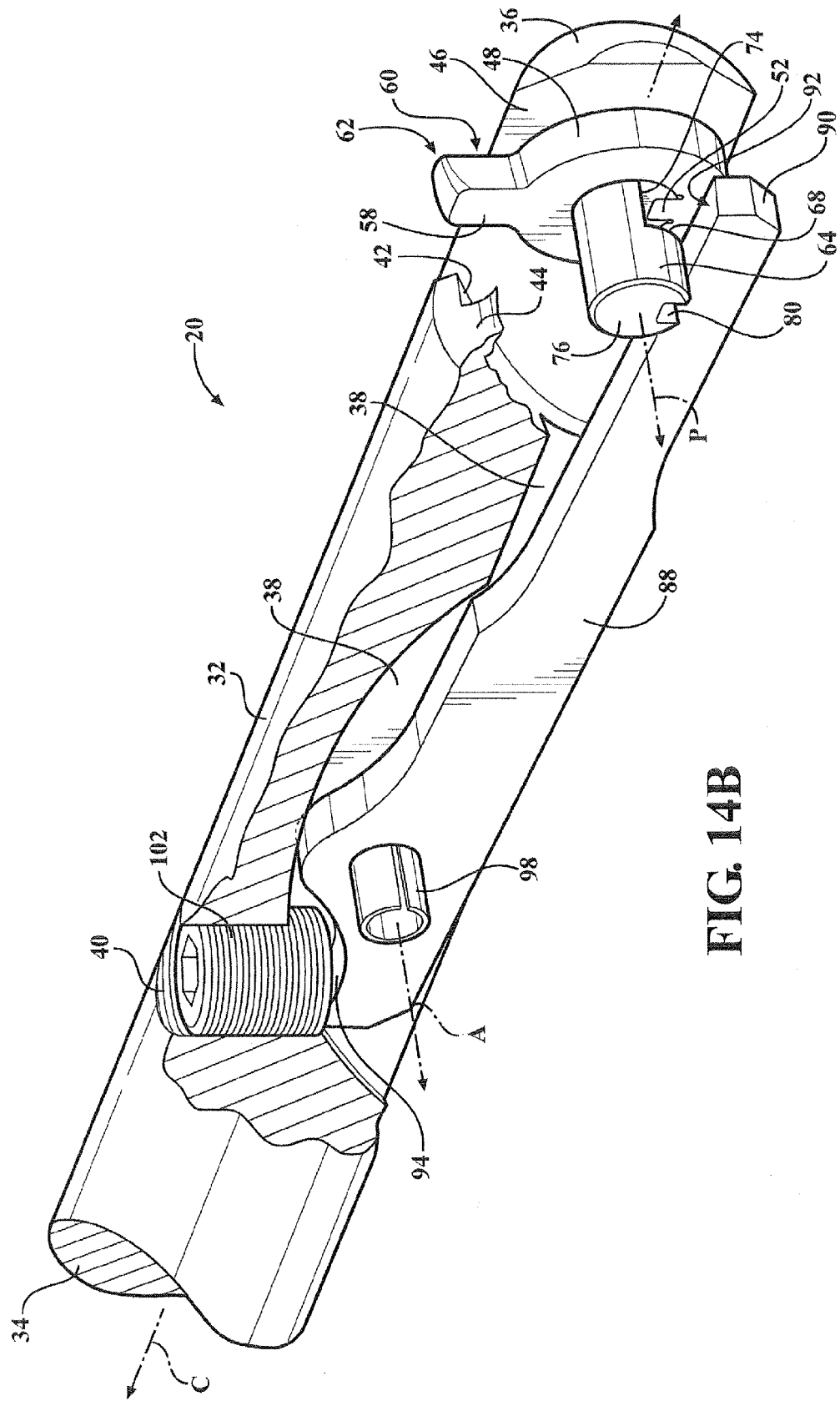
FIG. 14B is a broken cross-sectional perspective view of the deburring tool with the lever in a disengaged position.

Referring to FIGS. 13, 14A and 14B, the deburring tool 20 also includes a lever 88 disposed in the slot 38 of the arbor 32. The slot 38 is generally complementary in configuration to the lever 88 such that the lever 88 is movable and/or rotatable in the slot 38. The lever 88 is movable between an engaged position engaging the pivot 64 for applying a load to the pivot 64 and the cutter 48 and a disengaged position spaced from the pivot 64 for removing the pivot 64 and the cutter 48 from the arbor 32. In other words, since the pivot 64 concurrently rotates with the cutter 48 between the cutting position and the first and second non-cutting positions, the load is applied to the pivot 64 and thus the cutter 48. Said differently, the load applied to the pivot 64 by the lever 88 is transferred to the cutter 48 because the pivot 64 and the cutter 48 rotate together.

In addition, when the lever 88 is in the engaged position, the pivot 64 is prevented from moving along the pivot axis P, i.e., axially; therefore, the pivot 64 and the cutter 48 remains coupled to the arbor 32. When the lever 88 is in the disengaged position, the pivot 64 is movable along the pivot axis P, i.e., axially, for removing and/or replacing the cutter 48 with the new cutter. The lever 88 is rotatable about a pin axis A transverse to the central axis C between the engaged and disengaged positions. More specifically, when the lever 88 rotates about the pin axis A, the lever 88 is disposed in the first groove 68 when in the engaged position and the lever 88 is spaced from the first groove 68 when in the disengaged position. The engaged position is shown in FIGS. 7B, 8B, 9B, 13, and 14A and the disengaged position is shown in FIG. 14B. It is to be appreciated that the lever 88 can rotate either clockwise or counter-clockwise about the pin axis A. The pin axis A is spaced from the pivot axis P and in certain embodiments, the pin axis A is substantially parallel to the pivot axis P. It is to be appreciated that the lever 88 also rotates with the arbor 32 about the central axis C.

The load applied to the pivot 64 is adjustable for centralizing the cutter 48 in the arbor 32 and for providing a proper cutting force to the cutter 48. The cutting force acts on the cutter 48 in either a first direction or a second direction depending on which end surface 26, 28 of the aperture 22 is being deburred with the first direction being opposite to the second direction. For example, when the cutter 48 is deburring the first end surface 26 of the aperture 22, the cutting force is in the first direction and when the cutter 48 is deburring the second end surface 28 of the aperture 22, the cutting force is in the second direction. The cutting force acting on the cutter 48 causes the cutter 48 and thus the pivot 64 to rotate about the pivot axis P. The cutting force is as close as possible to the center of rotation of the pivot 64 for maximizing the sensitivity of the deburring tool 20 while minimizing the stress on the lever 88 which results in a smooth cutting action and extended life of the deburring tool 20.

The lever 88 includes an arm 90 engaging the pivot 64 when the lever 88 is in the engaged position and spaced from the pivot 64 when the lever 88 is in the disengaged position. The arm 90 engages the pivot 64 when the lever 88 is in the engaged position and the arm 90 is spaced from the pivot 64 when the lever 88 is in the disengaged position. The arm 90 biases by deflection when the pivot 64 rotates about the pivot axis P, as shown in FIGS. 7B and 9B. In other words, the arm 90 biases back and forth without being permanently deformed. Hence, the arm 90 of the lever 88 acts as a cantilevered beam. The biasing of the arm 90 as shown in FIGS. 7B and 9B are for illustrative purposes only and therefore, it is to be appreciated that the arm 90 can bias more or less than illustrated.

The arm 90 is formed of a metal material and more specifically formed of steel. One example of a suitable steel is spring steel. Typically, the arm 90 is formed of spring steel for allowing the arm 90 to bias during movement of the pivot 64 and the cutter 48 between the cutting position and the first and second non-cutting positions. More typically, the lever 88 is formed of spring steel. In other words, the entire lever 88 is formed of spring steel. It is to be appreciated that the arm 90 can be formed of spring steel and the rest of the lever 88 can be formed of any other suitable material. It is to also be appreciated that the arm 90 can be coupled to the lever 88 by welding, fasteners, adhesives and/or any other suitable method. It is to further be appreciated that the lever 88 and/or the arm 90 can be formed of any suitable material which allows biasing without permanent deformation.

The arm 90 is disposed in the first groove 68 when the lever 88 is in the engaged position and the arm 90 spaced from the first groove 68 when the lever 88 is in the disengaged position. The arm 90 includes a top surface 92 with the base surface 70 of the first groove 68 of the pivot 64 complementary to the top surface 92 such that the top surface 92 engages the base surface 70 when the cutter 48 is in the cutting position. The top surface 92 is further defined as a flat configuration. As such, the flat configuration of the top surface 92 selectively engages the flat configuration of the base surface 70 of the first groove 68 of the pivot 64. The top surface 92 of the arm 90 engages the first edge 72 when the cutter 48 is in the first non-cutting position as shown in FIG. 7B and the top surface 92 of the arm 90 engages the second edge 74 when the cutter 48 is in the second non-cutting position as shown in FIG. 9B. The arm 90 biases as the pivot 64 and the cutter 48 rotate about the pivot axis P between the cutting position and the first and second non-cutting positions. For example, the arm 90 biases downwardly when the top surface 92 engages the base surface 70 and/or the first and second edges 72, 74 as the cutter 48 rotates between the cutting position and the first and second non-cutting positions. The top surface 92 of the arm 90 of the lever 88 applies the load to the base surface 70 and/or the first and second edges 72, 74 of the pivot 64 when the lever 88 is in the engaged position, which thus applies the load to the cutter 48. It is to be appreciated that the arm 90 can bias in any suitable direction other than downwardly.

The lever 88 further includes a platform 94 with the arm 90 and the platform 94 spaced from each other transverse to the pin axis A. The lever 88 also defines a hole 96 along the pin axis A between the platform 94 and the arm 90. A pin 98 is disposed through the hole 96 and the arbor 32 for coupling the lever 88 to the arbor 32 and supporting the lever 88 during rotation between the engaged and disengaged positions. More specifically, the arbor 32 defines a second orifice 100 along the pin axis A with the pin 98 disposed in the second orifice 100 for coupling the lever 88 to the arbor 32. The pin 98 can be further defined as a spring pin, a split pin, an expandable pin or any other suitable pin/fastener for supporting the lever 88 and coupling the lever 88 to the arbor 32.

An adjustment member 102 is disposed in the bore 40 and engages the platform 94 for re-positioning the lever 88 about the pin axis A. More specifically, the adjustment member 102 re-positions the lever 88 to adjust the load applied to the pivot 64 and the cutter 48 when the lever 88 is in the engaged position and to remove the pivot 64 and the cutter 48 from the arbor 32 when the lever 88 is in the disengaged position. As such, the lever 88 remains in the engaged position when adjusting the load applied to the pivot 64 and the cutter 48. The adjustment member 102 can further be defined as a set screw having threads and the bore 40 can further be defined as a tapped bore 40 having threads such that the threads of the set screw engage the threads of the tapped bore 40 for adjusting the position of the adjustment member 102 in the bore 40. In other words, the set screw can be moved upwardly or downwardly in the bore 40. Said differently, the adjustment member 102 can move away from the slot 38 or toward the slot 38. It is to be appreciated that the adjustment member 102 can be any suitable member for re-positioning the lever 88.

For illustrative purposes only, the operation of the cutter 48 retracting between the first and second legs 44, 46 of the arbor 32 will be discussed below. As discussed above, the cutting force can be applied to the cutter 48 in either the first direction or the second direction when deburring the aperture 22 of the work piece 24. When the cutter 48 is in the cutting position before the cutting force is applied, as best shown in FIGS. 8B, 13, and 14A, the top surface 92 of the arm 90 of the lever 88 engages the entire base surface 70 of the first groove 68 of the pivot 64.

When deburring the first end surface 26 of the aperture 22 of the work piece 24, the cutting force is applied to the cutter 48 in the first direction and the cutter 48 and the pivot 64 rotate about the pivot axis P counter-clockwise as shown in FIG. 1. The arm 90 of the lever 88 deflects or biases downwardly as the pivot 64 rotates thus maintaining the load applied to the pivot 64 and the cutter 48. The base surface 70 of the first groove 68 of the pivot 64 becomes spaced from the top surface 92 of the arm 90 of the lever 88 as the cutter 48 and the pivot 64 continue to rotate counter-clockwise. The cutter 48 continues to rotate counter-clockwise until the cutter 48 is disposed in the aperture 22, at which time, the cutter 48 is in the first non-cutting position as shown in phantom lines in FIG. 1. In other words, the cutter 48 continues to be in the cutting position during counter-clockwise rotation until the cutter 48 is in the first non-cutting position. In the first non-cutting position, the cutter 48 and the pivot 64 have rotated counter-clockwise such that the top surface 92 of the arm 90 of the lever 88 engages the first edge 72 of the first groove 68 of the pivot 64 as shown in FIG. 7B with the cutter 48 retracted between the first and second legs 44, 46 as best shown in FIG. 7A.

When deburring the second end surface 28 of the aperture 22 of the work piece 24, the cutting force is applied to the cutter 48 in the second direction and the cutter 48 and the pivot 64 rotate about the pivot axis P clockwise as shown in FIG. 1. The arm 90 of the lever 88 deflects or biases downwardly as the pivot 64 rotates thus maintaining the load applied to the pivot 64 and the cutter 48. The base surface 70 of the first groove 68 of the pivot 64 becomes spaced from the top surface 92 of the arm 90 of the lever 88 as the cutter 48 and the pivot 64 continue to rotate clockwise. The cutter 48 continues to rotate clockwise until the cutter 48 is disposed in the aperture 22, at which time, the cutter 48 is in the second non-cutting position. In other words, the cutter 48 continues to be in the cutting position during clockwise rotation until the cutter 48 is in the second non-cutting position. In the second non-cutting position, the cutter 48 and the pivot 64 have rotated clockwise such that the top surface 92 of the arm 90 of the lever 88 engages the second edge 74 of the first groove 68 of the pivot 64 as shown in FIG. 9B with the cutter 48 again retracted between the first and second legs 44, 46 as shown in FIG. 9A.

When the cutter 48 is in the aperture 22 of the work piece 24, the arm 90 of the lever 88 biases to a maximum and only the non-cutting portion 62 is exposed to the aperture 22 for preventing undesirable cutting or marking of the aperture 22. When the cutter 48 exits the aperture 22 of the work piece 24, the arm 90 of the lever 88 biases back to its original position such that the top surface 92 engages the entire base surface 70 thus centralizing the cutter 48 and exposing the cutting portion 60. In other words, when the cutting force is removed from the cutter 48, the arm 90 biases back to its original position and the cutter 48 and the pivot 64 rotate about the pivot axis P such that the top surface 92 of the arm 90 engages the entire base surface 70 of the first groove 68 of the pivot 64.

For illustrative purposes only, the operation of the deburring tool 20 for adjusting the load applied to the pivot 64 and the cutter 48 will be discussed below. As discussed above, the load is adjustable for centralizing the cutter 48 in the arbor 32 and for providing the proper cutting force to the cutter 48. As also discussed above, the pivot 64 and the cutter 48 concurrently rotate such that the load applied to the pivot 64 is also applied to the cutter 48. In addition, as discussed above, the lever 88 remains in the engaged position when adjusting the load applied to the pivot 64 and the cutter 48; as such, the arm 90 remains engaged with the pivot 64.

To increase the load applied to the cutter 48, the adjustment member 102 is moved downwardly in the bore 40 toward the slot 38. As such, the adjustment member 102 increases a force applied to the platform 94 which moves the platform 94 downwardly and causes the lever 88 to rotate about the pin axis A counter-clockwise. Rotation of the lever 88 counter-clockwise causes the arm 90 of the lever 88 to increase the load applied the pivot 64 and thus increases the load applied to the cutter 48.

To decrease the load applied to the cutter 48, the adjustment member 102 is moved upwardly in the bore 40 away from the slot 38. As such, the adjustment member 102 decreases the force applied to the platform 94 which allows the arm 90 to rotate the lever 88 about the pin axis A clockwise such that the platform 94 moves upwardly and remains engaged with the adjustment member 102. Rotation of the lever 88 clockwise causes the arm 90 of the lever 88 to decrease the load applied the pivot 64 and thus decreases the load applied to the cutter 48.

For illustrative purposes only, the operation of the deburring tool 20 for replacing the cutter 48 will be discussed below. The cutter 48 is easily removable from the arbor 32 without the need for special tools. To remove the cutter 48 from the arbor 32, the adjustment member 102 is moved upwardly in the bore 40 away from the slot 38 such that the lever 88 is rotated to the disengaged position as shown in FIG. 14B. The arm 90 of the lever 88 disengages the pivot 64 and more specifically, the top surface 92 of the arm 90 is spaced from the first groove 68 of the pivot 64 such that the pivot 64 is able to move along the pivot axis P, i.e. axially. The pivot 64 moves through the first orifice 66 of at least one of the first and second arms 90 and moves through the slit 42 thus allowing the cutter 48 to be removed from the arbor 32. In other words, the pivot 64 can be completely removed from the first orifice 66 of the first and second legs 44, 46 or alternatively the pivot 64 can be removed from the first orifice 66 of one of the first and second legs 44, 46. Said differently, the pivot 64 is moved out of the slit 42 for removing the cutter 48 from the slit 42 between the first and second legs 44, 46. Typically, the pivot 64 is removable from the first and/or second legs 44, 46 in one direction due to the various configurations of the pivot 64 and the cutter 48 as discussed above. Therefore, only the pivot 64 of FIG. 10 will be used in this discussion for illustrative purposes. As the pivot 64 moves through the first orifice 66 of the first and second legs 44, 46, the second groove 80 of the pivot 64 moves along the protrusion 52 of the cutter 48. Once the protrusion 52 of the cutter 48 disengages from the second groove 80 of the pivot 64, the cutter 48 is removable from the arbor 32. More specifically, once the pivot 64 is removed from the first and second legs 44, 46, the old cutter 48 can be removed from the slit 42 between the first and second legs 44, 46 of the arbor 32.

The new cutter can then be disposed in the slit 42 between the first and second legs 44, 46 with the protrusion 52 of the new cutter aligned with the second groove 80 of the same pivot 64. The pivot 64 is inserting through the first orifice 66 of the first and second legs 44, 46 with the first groove 68 aligning with the lever 88. The adjustment member 102 is moved downwardly toward the slot 38 such that the lever 88 rotates back to the engaged position as shown in FIG. 14A. The arm 90 of the lever 88 re-engages the pivot 64 and more specifically, the top surface 92 of the arm 90 engages the base surface 70 of the first groove 68 of the pivot 64 such that the pivot 64 is prevented from moving along the pivot axis P, i.e. axially. Said differently, when the lever 88 moves back to the engaged position, the load is again applied to the pivot 64 and thus the cutter 48. The support can be utilized for aiding in removing the old cutter 48 and coupling the new cutter to the first and second legs 44, 46 of the arbor 32.

Many modifications and variations of the present invention are possible in light of the above teachings. The foregoing invention has been described in accordance with the relevant legal standards; thus, the description is exemplary rather than limiting in nature. Variations and modifications to the disclosed embodiment can become apparent to those skilled in the art and do come within the scope of the invention. Accordingly, the scope of legal protection afforded this invention can only be determined by studying the following claims.

What is claimed is:

1. A deburring tool for deburring an aperture of a work piece, said deburring tool comprising:
   an arbor rotatable about a central axis and having a proximal end and a distal end spaced from each other along said central axis with said arbor defining a slot between said proximal and distal ends;

a cutter coupled to said distal end and rotatable about a pivot axis transverse to said central axis between a cutting position, a first non-cutting position, and a second non-cutting position opposite said first non-cutting position;

a pivot disposed through said cutter along said pivot axis and coupled to said distal end of said arbor with said pivot supporting said cutter during movement between said cutting position and said first and second non-cutting positions; and a lever disposed in said slot of said arbor and movable between an engaged position engaging said pivot for applying a load to said pivot and said cutter and a disengaged position spaced from said pivot for removing said pivot and said cutter from said arbor;

wherein said lever is rotatable about a pin axis transverse to said central axis between said engaged and disengaged positions;

wherein said lever includes an arm engaging said pivot when said lever is in said engaged position and spaced from said pivot when said lever is in said disengaged position;

wherein said pivot defines a first groove transverse to said pivot axis with said arm disposed in said first groove when said lever is in said engaged position and said arm spaced from said first groove when said lever is in said disengaged position.

2. A deburring tool as set forth in claim 1 wherein said arm is formed of a spring steel for allowing said arm to bias during movement of said pivot and said cutter between said cutting position and said first and second non-cutting positions.

3. A deburring tool as set forth in claim 1 wherein said cutter defines a passage along said pivot axis and a cutout extending from said passage away from said pivot axis and wherein said pivot defines a first groove transverse to said pivot axis and includes a projection extending outwardly away from said pivot axis and spaced from said first groove with said projection receiving said cutout such that said pivot concurrently rotates with said cutter between said cutting position and said first and second non-cutting positions.

4. A deburring tool as set forth in claim 1 wherein said cutter defines a passage along said pivot axis with said passage presenting at least one flat surface and wherein said pivot defines a first groove transverse to said pivot axis and defines at least one notch spaced from said first groove with said flat surface corresponding to said notch such that said pivot concurrently rotates with said cutter between said cutting position and said first and second non-cutting positions.

5. A deburring tool as set forth in claim 1 wherein said pivot and said cutter are rotatable together about said pivot axis and said pivot is movable along said pivot axis when said lever is in said disengaged position.

6. A deburring tool as set forth in claim 1 wherein said distal end of said arbor defines a slit extending toward said proximal end axially relative to said central axis to define a first leg and a second leg spaced from each other transverse to said central axis with said cutter disposed between said first and second legs and said pivot coupled to said first and second legs.

7. A deburring tool as set forth in claim 6 wherein said cutter includes an extension having a cutting portion with said cutting portion extending outwardly from said slit when said cutter is in said cutting position and said cutting portion retracted in said slit when said cutter is in said first and second non-cutting positions.

8. A deburring tool as set forth in claim 1 wherein said lever includes a platform with said platform and said arm spaced from each other transverse to said pin axis with said arm engaging said pivot when said lever is in said engaged position and said arm spaced from said pivot when said lever is in said disengaged position.

9. A deburring tool as set forth in claim 8 wherein said arbor defines a bore transverse to said central axis and further including an adjustment member disposed in said bore and engaging said platform for re-positioning said lever about said pin axis to adjust said load applied to said pivot and said cutter when said lever is in said engaged position and to remove said pivot and said cutter from said arbor when said lever is in said disengaged position.

10. A deburring tool as set forth in claim 8 wherein said lever defines a hole along said pin axis between said platform and said arm and further including a pin disposed through said hole and said arbor for coupling said lever to said arbor and supporting said lever during rotation between said engaged and disengaged positions.

11. A deburring tool as set forth in claim 1 wherein said arm includes a top surface and said first groove of said pivot presents a base surface complementary to said top surface such that said top surface engages said base surface when said cutter is in said cutting position.

12. A deburring tool as set forth in claim 11 wherein said top surface is further defined as a flat configuration and said base surface defines a flat configuration.

13. A deburring tool as set forth in claim 11 wherein said first groove of said pivot presents a first edge and a second edge spaced from each other transverse to said pivot axis such that said base surface is disposed between said first and second edges with said top surface of said arm engaging said first edge when said cutter is in said first non-cutting position and said top surface of said arm engaging said second edge when said cutter is in said second non-cutting position.

14. A deburring tool as set forth in claim 13 wherein said pivot concurrently rotates with said cutter between said cutting position and said first and second non-cutting positions such that said load is applied to said cutter with said arm biasable when engaging said base surface and said first and second edges such that said cutter is rotatable between said cutting position and said first and second non-cutting positions.

15. A deburring tool as set forth in claim 1 wherein said cutter defines a passage along said pivot axis and includes a protrusion extending from said passage toward said pivot axis.

16. A deburring tool as set forth in claim 15 wherein said pivot defines a second groove axially relative to said pivot axis with said pivot disposed through said passage of said cutter and said protrusion of said cutter disposed in said second groove such that said pivot concurrently rotates with said cutter between said cutting position and said first and second non-cutting positions such that said load is applied to said cutter and wherein said pivot includes a first end and a second end spaced from each other along said pivot axis with said second groove extending from one of said first and second ends toward an other one of said first and second ends.

17. A deburring tool as set forth in claim 16 wherein said second groove extends from said first end toward said second end and is spaced from said second end.

18. A deburring tool for deburring an aperture of a work piece, said deburring tool comprising:

an arbor rotatable about a central axis and having a proximal end and a distal end spaced from each other along said central axis with said arbor defining a slot between said proximal and distal ends;

a cutter coupled to said distal end and rotatable about a pivot axis transverse to said central axis between a cutting position, a first non-cutting position, and a second non-cutting position opposite said first non-cutting position;

a pivot disposed through said cutter along said pivot axis and coupled to said distal end of said arbor with said pivot supporting said cutter during movement between said cutting position and said first and second non-cutting positions; and a lever disposed in said slot of said arbor and movable between an engaged position engaging said pivot for applying a load to said pivot and said cutter and a disengaged position spaced from said pivot for removing said pivot and said cutter from said arbor;

wherein said cutter defines a passage along said pivot axis with said passage presenting at least one flat surface and wherein said pivot defines a first groove transverse to said pivot axis and defines at least one notch spaced from said first groove with said flat surface corresponding to said notch such that said pivot concurrently rotates with said cutter between said cutting position and said first and second non-cutting positions.

19. A deburring tool for deburring an aperture of a work piece, said deburring tool comprising:

an arbor rotatable about a central axis and having a proximal end and a distal end spaced from each other along said central axis with said arbor defining a slot between said proximal and distal ends;

a cutter coupled to said distal end and rotatable about a pivot axis transverse to said central axis between a cutting position, a first non-cutting position, and a second non-cutting position opposite said first non-cutting position;

a pivot disposed through said cutter along said pivot axis and coupled to said distal end of said arbor with said pivot supporting said cutter during movement between said cutting position and said first and second non-cutting positions; and a lever disposed in said slot of said arbor and movable between an engaged position engaging said pivot for applying a load to said pivot and said cutter and a disengaged position spaced from said pivot for removing said pivot and said cutter from said arbor;

said pivot defining a groove transverse to said pivot axis with said lever disposed in said groove of said pivot when said lever is in said engaged position.

20. A deburring tool as set forth in claim 19 wherein said groove extends through said pivot in parallel with said central axis.

21. A deburring tool as set forth in claim 19 wherein said lever is rotatable between said engaged and disengaged positions about a pin axis, said pin axis and said pivot axis extending in parallel with each other.

* * * * *